(12) United States Patent
Oldenburg et al.

(10) Patent No.: US 8,941,265 B2
(45) Date of Patent: Jan. 27, 2015

(54) MINIMAL INTERRUPTION DC POWER SUPPLY

(75) Inventors: Wayne H. Oldenburg, Theodosia, MO (US); Cecil W. Sims, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 963 days.

(21) Appl. No.: 12/908,134

(22) Filed: Oct. 20, 2010

(65) Prior Publication Data

US 2012/0098345 A1 Apr. 26, 2012

(51) Int. Cl.
*H02J 9/00* (2006.01)
*H02J 1/00* (2006.01)
*H02J 3/00* (2006.01)
*H02J 1/10* (2006.01)
*H02J 9/06* (2006.01)

(52) U.S. Cl.
CPC .. *H02J 1/10* (2013.01); *H02J 9/061* (2013.01)
USPC .................... 307/80; 307/64; 307/65; 307/66

(58) Field of Classification Search
None
See application file for complete search history.

(56) References Cited

U.S. PATENT DOCUMENTS

| | | | |
|---|---|---|---|
| 1,973,018 A | 9/1934 | Shrimpton | |
| 5,040,088 A | 8/1991 | Harrington et al. | |
| 5,138,184 A | 8/1992 | Keefe | |
| 5,177,657 A | 1/1993 | Baer et al. | |
| 5,764,502 A | 6/1998 | Morgan et al. | |
| 6,198,613 B1 | 3/2001 | Rozman | |
| 6,252,751 B1 | 6/2001 | Rozman | |
| 6,687,104 B2 | 2/2004 | Aiello | |
| 6,768,350 B1 | 7/2004 | Dickey | |
| 6,806,589 B1 | 10/2004 | Suttie | |
| 6,924,613 B2 | 8/2005 | Jonsson et al. | |
| 7,064,458 B2* | 6/2006 | Wittner | 307/65 |
| 7,236,338 B2 | 6/2007 | Hale et al. | |
| 7,633,733 B1 | 12/2009 | El-Sayed | |
| 7,805,204 B2 | 9/2010 | Ghanekar et al. | |
| 2004/0257271 A1* | 12/2004 | Jacobson et al. | 342/175 |
| 2007/0079012 A1* | 4/2007 | Walker | 709/249 |
| 2009/0189455 A1* | 7/2009 | Rusan et al. | 307/82 |
| 2009/0228223 A1* | 9/2009 | Liu et al. | 702/59 |
| 2010/0254046 A1* | 10/2010 | Liu et al. | 361/8 |

OTHER PUBLICATIONS

European Search Report dated Jul. 10, 2012 for European Application No. 11189614.8.

* cited by examiner

*Primary Examiner* — Jared Fureman
*Assistant Examiner* — Aqeel Bukhari
(74) *Attorney, Agent, or Firm* — Carlson, Gaskey & Olds, P.C.

(57) ABSTRACT

A DC power distribution system and method includes a solid state remote power controller that connects a switching power source to a DC bus when the DC bus is switching power sources thereby providing a nearly uninterrupted power supply to the DC bus.

21 Claims, 3 Drawing Sheets

MINIMAL INTERRUPTION DC POWER SUPPLY

BACKGROUND

The present disclosure is directed generally to DC power distribution systems, and particularly to a minimal interruption DC power supply system.

As with many vehicles, aircraft often include electrical components that have a relatively long startup sequence that must be performed prior to normal operation of the electrical components. These components can be utilized in flight controls, or other systems within the aircraft. If power to these systems is interrupted for longer than a brief period, the systems can shutdown. When the systems shut down, the startup sequence must be performed again after power is restored before normal system operations can resume. This increases the downtime during which the aircraft cannot utilize these systems.

SUMMARY

Disclosed is a method for minimal interruption power source switching that has the steps of monitoring power characteristics of a DC bus and a plurality of DC bus inputs, determining if a fault condition is present on the DC bus, activating a switching power source when the power characteristic falls below a threshold and no fault is present on the DC bus, and deactivating the switching power source when the power characteristic exceeds the threshold and no fault is present on the DC bus.

Also disclosed is a minimally interruptible power source having a DC power bus, a controller coupled to the DC power bus and capable of controlling power functions of the DC power bus, a solid state remote power controller (SSRPC) connecting the DC power bus to a switching power source, a plurality of electrical contactors, each of the contactors connecting one of a plurality of primary power sources to the controller, and a communication line for connecting the controller to at least one other controller within a power system.

Also disclosed is a DC power distribution system having a plurality of DC power buses, each of the DC power buses having a controller capable of controlling power functions of the DC power bus, a solid state remote power controller (SSRPC) connecting the DC power bus to a switching power source, a plurality of electrical contactors connecting one of a plurality of primary power sources to the controller, a communication line for connecting the controller to at least one other controller within a power system, and a plurality of power generators. Each of the power generators is capable of providing power to at least one of the plurality of DC power buses.

These and other features of the present invention can be best understood from the following specification and drawings, the following of which is a brief description.

DETAILED DESCRIPTION

Figure 1:
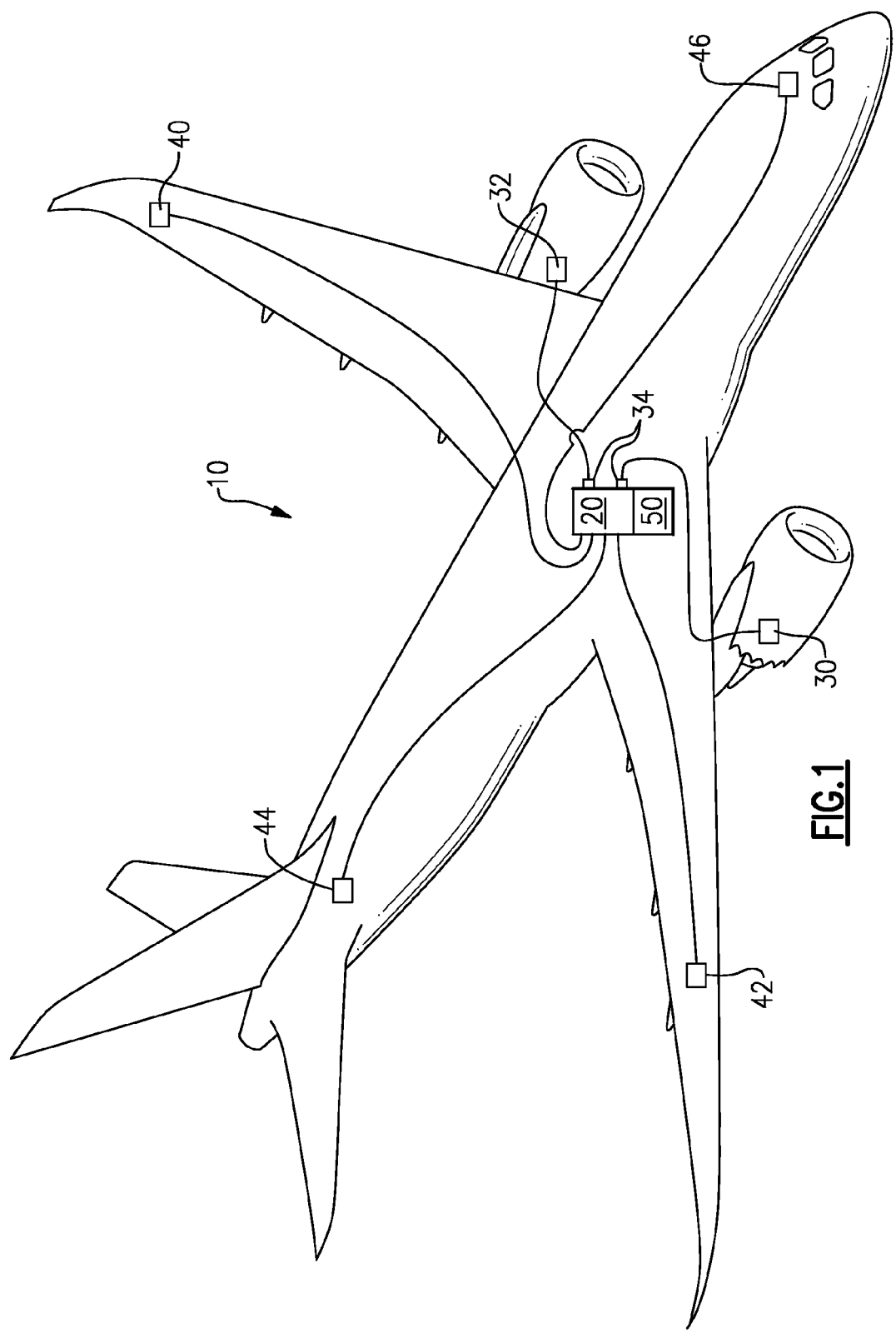
FIG. 1 schematically illustrates an example aircraft power system.

FIG. 1 illustrates an aircraft 10 that has a power system for distributing power to multiple electrical systems 40, 42, 44, 46 located throughout the aircraft 10. Each of the electrical systems 40, 42, 44, 46 are flight components, sensors, controllers or other components. Alternately, one or more of the electrical systems 40, 42, 44, 46 is another DC power distribution bus relying on the DC bus 20 as a power source. Included within the power system is a DC bus 20 that is capable of receiving power from each of two connected power sources 30, 32. The power sources 30, 32 are connected to the DC bus 20 via electrical contactors 34, which can be opened or closed via a controller 50 contained within the DC bus 20 thereby controlling the electrical connection between the DC bus 20 and the power sources 30, 32.

Under normal operating conditions, the DC power bus 20 receives power from only one of the power sources 30, 32 at a time. Variations from the normal operating conditions can require the DC bus 20 to switch which power source 30, 32 it is receiving power from one or more times during operation of the power system. In order to accomplish this switch, the controller 50 disconnects the currently connected power source 30, 32 by opening the contactor 34 associated with the primary power source 30, 32, and then electrically connects the secondary power source 30, 32 to the DC bus 20 by closing the contactor 34 associated with the secondary power source 30, 32. Alternately, each of the connected power sources 30, 32 could be a power distribution bus acting as a DC source for the DC bus 20.

The switching process results in a downtime during which both the primary power source 30, 32 and the secondary power source 30, 32 are not connected to the DC power bus 20, and consequently, the DC power bus 20 provides no electrical power to the connected electrical systems 40, 42, 44, 46 for the duration of the downtime. In order to provide power during the downtime, a solid state remote power controller (SSRPC) (illustrated in FIG. 2) can connect the DC power bus 20 to a switching power source.

Figure 2:
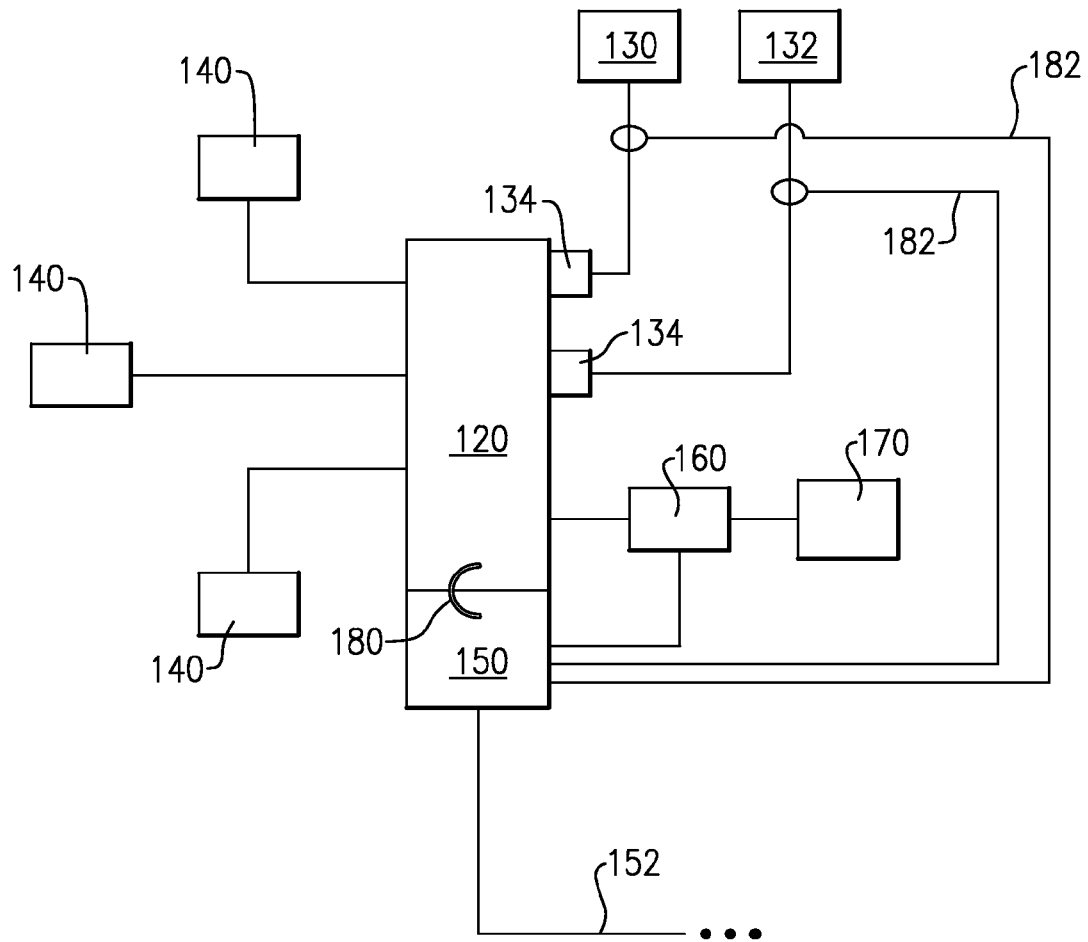
FIG. 2 illustrates an example DC bus configuration that could be used in a power network.

FIG. 2 schematically illustrates a power system using a SSRPC 160 to connect a DC bus 120 to a switching power source 170. The DC bus 120 is connected to a pair of power sources 130, 132 via contactors 134. The DC power bus 120 provides output power to multiple electrical systems 140 during normal operations. The electrical systems 140 can be aircraft systems, or further DC power distribution busses which rely on the DC power bus 120 as a power source. The controller 150 includes at least one communication line 152 for communicating with other DC power bus controllers distributed throughout a power system. The controller 150 further includes sensor input lines 180, 182 for receiving DC bus 120 voltage measurements (via input line 180) and source current measurements (via input line 182). The source current measurements and DC bus voltage measurements can be derived from any known measurement type. In one example, the source current measurements are taken using Hall effect sensors located at each of the power sources 130, 132.

The controller 150 is a field programmable gate array (FPGA) or an application specific integrated circuit (ASIC) that is capable of controlling the SSRPC 160, and thereby connecting the switching power source 170 to the DC power bus 120. The controller 150 is also capable of controlling the contactors 134 and other DC bus 120 functions. The controller 150 can turn the SSRPC 160 on when the first contactor 134 is closed and turn the SSRPC 160 off when the second contactor 134 is opened. The use of a dedicated controller 150, such as an FPGA or an ASIC, allows the SSRPC 160 to be switched on as the first contactor 134 is opened, and switched off as the second contactor 134 is closed, thereby allowing for the DC power bus 120 to receive a nearly uninterrupted power signal.

As described above, the DC power bus 120 can be used within a network of other DC power busses and can utilize other DC power buses as the power sources 130, 132. In such a case, a fault present in the DC power bus 120 can be propagated to any connected DC power busses if the faulty DC power bus 120 is not isolated. Fault propagation can be further aggravated if the method used by the controller 150 to determine that the power source 130, 132 should be switched can be falsely triggered by a DC bus controller 150. The controller 150 includes a computer readable medium that stores instructions and/or logic to implement a process capable of detecting power source 130, 132 switching and detecting a fault on the DC bus 120. The power source switching process is described in detail below.

Figure 3:
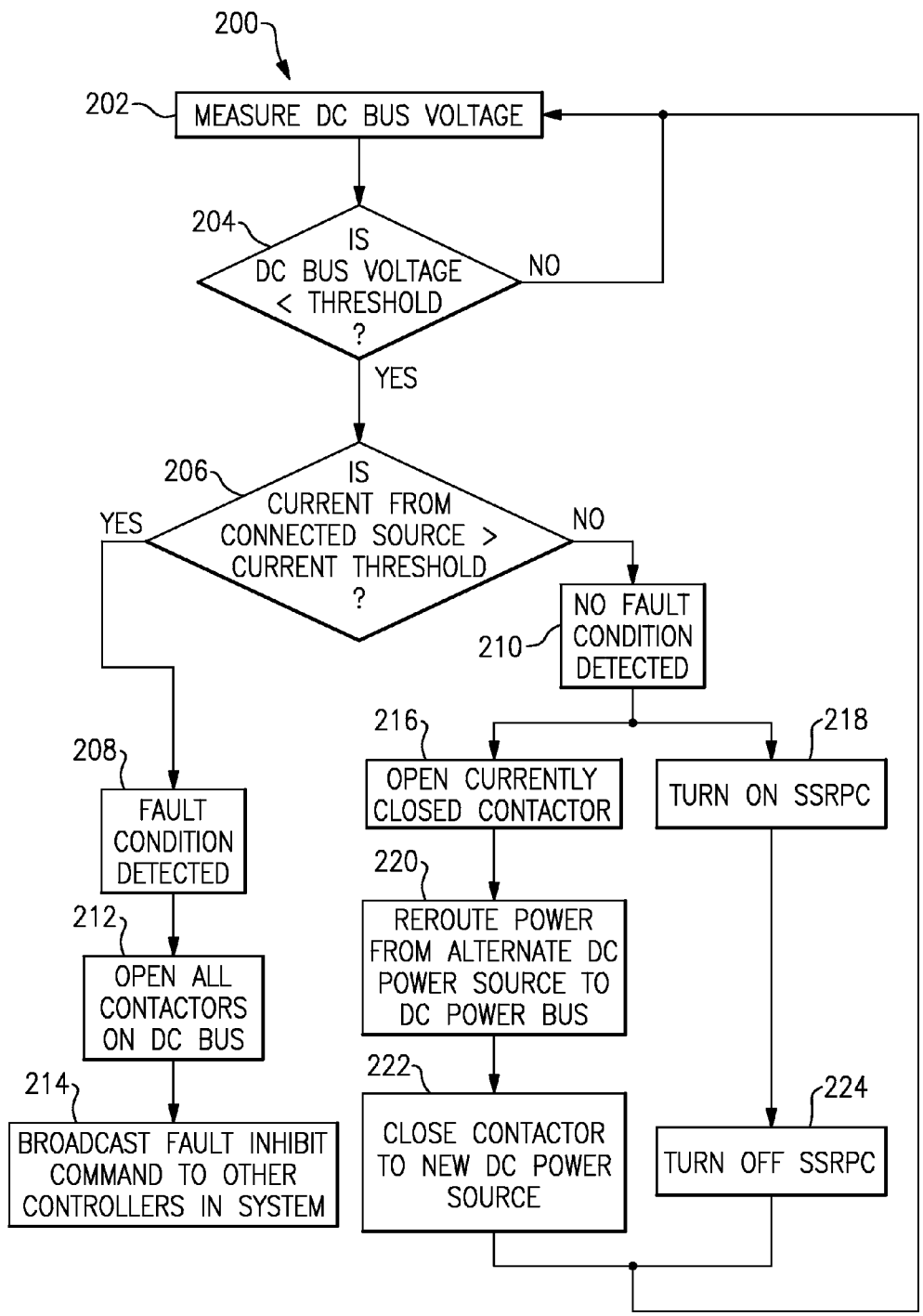
FIG. 3 illustrates an example process for switching a DC bus power source.

FIG. 3 illustrates a process 200 for controlling the DC power bus 120 that accounts for a fault within the power bus 120, and that reduces the duration of switching downtime to a minimum. Initially the controller 150 receives a measurement of the DC bus voltage from a sensor in a "measure DC bus voltage" step 202. The DC bus voltage can be measured using any known measuring technique, and input at a DC bus voltage input line 180 on the controller 150. The controller 150 checks the DC bus voltage against a low voltage threshold in an "is DC bus voltage less than low voltage threshold" step 204. If the DC bus voltage is above the threshold, the process returns to the measure DC bus voltage step 202, and continues the process 200.

Alternately, if the DC bus voltage is lower than the threshold, one of two situations is present. In one situation, the DC bus 120 can have a fault, causing the voltage to drop extremely low, and rendering the DC bus 120 unsuitable for operation. Alternately, the power source 130, 132 providing power to the DC bus 120 could be providing little or no power to the DC bus 120, thereby requiring the DC bus controller 150 to disconnect the power source 130, 132 and redirect power from another power source 130, 132 to the DC bus 120. In order to distinguish between the two situations, the controller 150 compares a DC source current measurement with a high current threshold, in the "is current from connected source greater than current threshold" step 206. If the source current is above the current threshold, the controller 150 determines that a fault condition is present, and moves to the "fault condition detected" step 208. Alternately, if the source current does not exceed the threshold, the controller 150 determines that there is no fault within the DC bus and moves to the "no fault condition detected" step 210.

In the fault condition detected branch of the process 200, the controller 150 causes all DC source contactors 134 at the DC bus 120 to be placed in an open state in an "open all contactors on DC bus" step 212. This step causes the faulty DC bus 120 to be isolated from the power distribution system, thereby preventing the fault from propagating throughout the power distribution system. The controller 150 then broadcasts a fault inhibit command over the communication line 152 to all other DC busses in the DC power system in a "broadcast fault inhibit command to other controllers in system" step 214. The fault inhibit command is a code that identifies the DC bus 120 with the fault, and instructs the other controllers not to close any contactors connecting to the faulty DC power bus 120, thereby preventing power from being redirected through the faulty bus by other power distribution buses in the system.

In the no fault detected branch of the process 200, the controller 150 simultaneously engages two parallel paths. First, the controller 150 opens the contactor 134 connecting the current power source 130, 132 to the DC power bus 120 in the "open currently closed contactor" step 216. At the same or approximately the same time, the controller 150 turns on the SSRPC 160 in the "turn on SSRPC" step 218. Turning on the SSRPC 160 creates a direct connection between the DC power bus 120 and the switching power source 170, thereby ensuring that the DC bus 120 is only without power for the time required to sense if a fault exists and switch on the SSRPC 160.

Next the controller 150 reroutes the power distribution system so that the DC power bus 120 receives power from an alternate source 130, 132 in the "reroute power from alternate DC power source to DC power bus" step 220. Turning on the SSRPC 160 during the open currently closed contactor step 216 allows the DC power bus to receive power stored in the switching power source 170 for the duration of the "reroute power from alternate DC power source to DC power bus" step 220 during which no power sources 130, 132 are connected to the DC power bus 120, thereby preventing the attached electrical systems 140 from depowering. By way of example, the switching power source 170 could be a battery backup power source or the like.

Once the controller 150 has rerouted power from the secondary power source 130, 132, to the DC bus 120, the controller closes a contactor 134 connecting the new power source 130, 132 to the DC power bus 120 in the "close contactor to new DC power source" step 222. Simultaneously with closing the contactor 134, the controller 150 turns off the SSRPC 160 in the "turn off SSRPC" step 224. Once each of these steps has been completed, the controller 150 returns to the initial step 202 of the process 200, and begins again.

Due to the time sensitive nature of the process 200, either an application specific integrated circuit (ASIC) or a field programmable gate array (FPGA) controller is used to perform the steps of the process 200. Both ASIC and FPGA controllers are capable of performing the analysis and steps of the process in a significantly reduced time relative to currently used microcontrollers. ASICs and/or FPGAs can enable substantially parallel operations to occur in contrast to the sequential operations of microcontrollers. This allows the SSRPC 160 to be switched on within less than 10 milliseconds of a loss of power to the DC bus 120 in some examples and within less than 2 milliseconds of a loss of power to the DC bus 120 in other examples.

The above described example apparatus and method is described with regard to two possible power sources, however, a person of ordinary skill in the art would understand the system and method to apply to a DC bus using any number of possible power sources and is not limited to the express example.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A method for minimal interruption power source switching comprising the steps of:
   disconnecting a first power source from a DC bus, thereby removing power from said DC bus;
   connecting a second power source to said DC bus, thereby providing power to said DC bus;
   monitoring at least one power characteristics of the DC bus and a plurality of DC bus inputs;
   determining if a fault condition is present on the DC bus by comparing a DC bus voltage to a low voltage threshold, comparing a DC bus input current to a high current threshold, and determining that a fault condition exists in said DC bus when the DC bus voltage is under the low voltage threshold and the DC bus input current is over the high current threshold; and activating a solid state remote power controller (SSRPC) during the step of disconnecting the first power source and deactivating the SSRPC during the step of connecting the second power source, thereby providing power to said DC bus during a time period between performance of the steps of disconnecting the first power source from said DC bus and connecting the second power source to said DC bus.

2. The method of claim 1, wherein the step of activating the solid state remote power controller (SSRPC) during the step of disconnecting the first power source and deactivating the SSRPC during the step of connecting the second power source comprises the steps of:

activating the SSRPC when at least one of said power characteristics falls below a threshold and no fault is present on the DC bus; and deactivating the SSRPC when the at least one of said power characteristics exceeds the threshold and no fault is present on the DC bus.

3. The method of claim 1, wherein said step of monitoring power characteristics of a DC bus comprises the steps of:

monitoring a DC bus voltage using a controller; and monitoring a DC bus input current from each of multiple DC sources connected to said DC bus.

4. The method of claim 3, wherein the step of monitoring the DC bus input current comprises receiving at least one Hall effect sensor reading.

5. The method of claim 1, further comprising the step of rerouting power from a primary power source to a secondary power source when the DC bus voltage falls below a low voltage threshold and no fault is present in the DC bus.

6. The method of claim 1, wherein the step of activating the SSRPC comprises switching on the SSRPC, thereby connecting a switching power source to said DC bus.

7. The method of claim 1, further comprising the step of opening each of a plurality of contactors connecting DC sources to said DC bus when a fault is detected.

8. The method of claim 7, further comprising the step of broadcasting a fault inhibit command, thereby preventing other controllers from closing said plurality of contactors.

9. The method of claim 1, wherein said steps of activating the SSRPC and deactivating the SSRPC result in said DC bus being disconnected from a voltage source for a duration less than 10 milliseconds.

10. The method of claim 9, wherein said duration is less than 2 milliseconds.

11. The method of claim 1, wherein the method is performed using a field programmable gate array (FPGA).

12. The method of claim 1, wherein the method is performed using an application specific integrated circuit (ASIC).

13. The method of claim 1, further comprising the steps of opening a closed DC bus contactor when said at least one of said power characteristics falls below a threshold and no fault is present on the DC bus, thereby disconnecting a primary power source from said DC bus; and closing an open DC bus contactor when said at least one of said power characteristics falls below a threshold and no fault is present on the DC bus, thereby connecting an alternate power source to said DC bus.

14. A minimally interruptible power source comprising:

a DC power bus;

a controller, coupled to said DC power bus, said controller being capable of controlling power functions of said DC power bus, wherein the controller includes a DC bus voltage measurement input and at least one DC source current input, and wherein the controller is operable to detect a fault when the DC bus voltage input is below a low voltage threshold and at least one DC source current input is above a high current threshold;

a solid state remote power controller (SSRPC) connecting said DC power bus to a switching power source;

a plurality of electrical contactors, each of said contactors connecting one of a plurality of primary power sources to said controller; and a communication line for connecting said controller to at least one other controller within a power system.

15. The minimally interruptible power source of claim 14, wherein said controller comprises a field programmable gate array (FPGA).

16. The minimally interruptible power source of claim 14, wherein said controller comprises an application specific integrated circuit (ASIC).

17. The minimally interruptible power source of claim 14, further comprising a DC bus voltage sensor connected to said DC power bus and said controller, thereby allowing said controller to measure a voltage on said DC power bus.

18. The minimally interruptible power source of claim 14, further comprising a plurality of DC input current sensors, each of said input current sensors being connected to a power source input, thereby allowing said controller to measure a DC input current associated with each power source.

19. A DC power distribution system comprising:

a plurality of DC power buses, each of said DC power buses having a controller capable of controlling power functions of said DC power bus, a solid state remote power controller (SSRPC) connecting said DC power bus to a switching power source, a plurality of electrical contactors, each of said contactors connecting one of a plurality of primary power sources to said controller, a communication line for connecting said controller to at least one other controller within a power system;

a plurality of power generators, each of said power generators being capable of providing power to at least one of said plurality of DC power buses; and wherein each of said controllers includes a DC bus voltage input and at least one DC source current input and wherein each of said controllers is operable to detect a fault when the DC bus voltage input is below a low voltage threshold and at least one DC source current input is above a high current threshold.

20. The minimally interruptible power source of claim 14, wherein the controller further comprises a non-transitory memory storing the low voltage threshold and the high current threshold.

21. The DC power distribution system of claim 19, wherein each of said controllers further comprises a non-transitory memory storing the low voltage threshold and the high current threshold.

* * * * *